United States Patent [19]

Dasso

[11] Patent Number: 5,434,613
[45] Date of Patent: Jul. 18, 1995

[54] METHOD AND APPARATUS FOR GENERATING A THREE-DIMENSIONAL EFFECT FOR TWO-DIMENSIONAL IMAGES

[76] Inventor: John M. Dasso, 2933 SE. Taylor, Portland, Oreg. 97214

[21] Appl. No.: 990,394

[22] Filed: Dec. 10, 1992

[51] Int. Cl.⁶ ...................... H04N 13/00; H04N 15/00
[52] U.S. Cl. ........................ 348/42; 348/44; 348/51; 348/54
[58] Field of Search .......... 358/89, 91, 88, 3; 352/86, 57; 359/458, 466; H04N 13/00, 15/00; 348/42, 44, 49, 51, 53, 54, 55

[56] References Cited

U.S. PATENT DOCUMENTS

| | | | |
|---|---|---|---|
| 2,865,988 | 12/1958 | Cafarelli, Jr. | 358/89 |
| 4,705,371 | 11/1987 | Beard | 352/86 |
| 4,709,263 | 11/1987 | Brumage | 358/88 |
| 4,893,898 | 1/1990 | Beard | 358/89 |
| 5,243,460 | 9/1993 | Kornberg | 358/88 |

FOREIGN PATENT DOCUMENTS 9015356 12/1990 WIPO.

*Primary Examiner*—Tommy P. Chin
*Assistant Examiner*—Vu Le
*Attorney, Agent, or Firm*—Robert L. Harrington

[57] ABSTRACT

A method and apparatus for creating an illusion of depth when viewing moving pictures projected on a plane surface. A member such as a lens is placed over the dominant eye of a viewer. The lens is designed to slow light transmission whereby impingement of the image onto the dominant eye is slightly delayed as compared to the impingement of the image onto the docile eye of the viewer. Moving images are thus viewed by the two eyes at different positions which the viewer's brain interrupts to be depth dimension.

5 Claims, 3 Drawing Sheets

FIG. 3
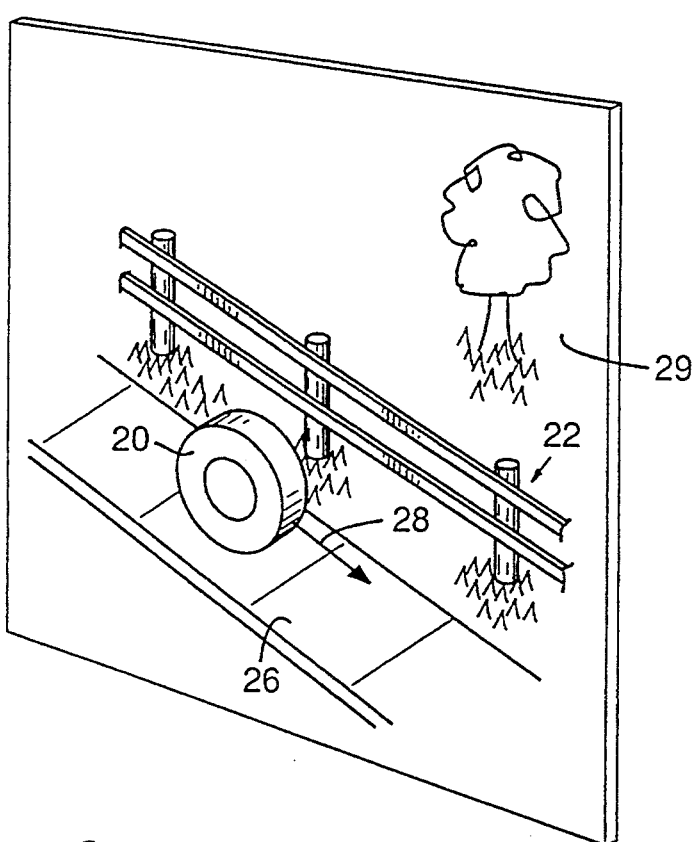
FIG. 4
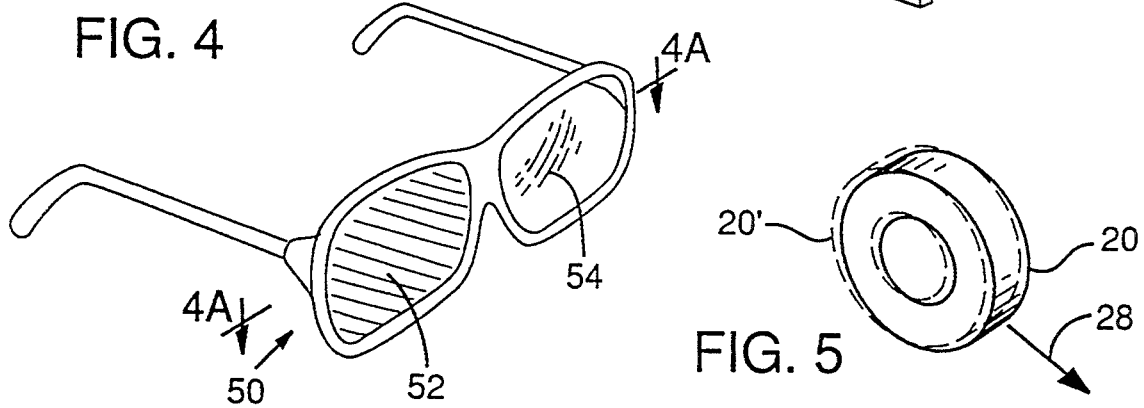
FIG. 5
FIG. 4A
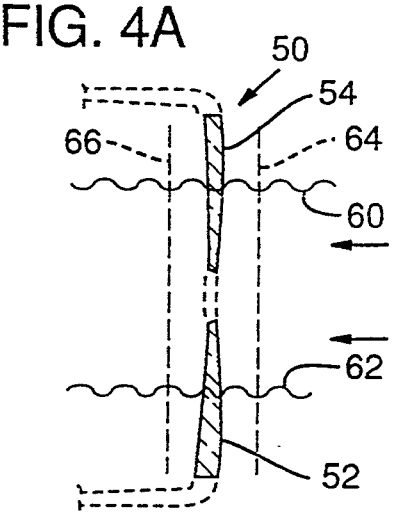
FIG. 4B
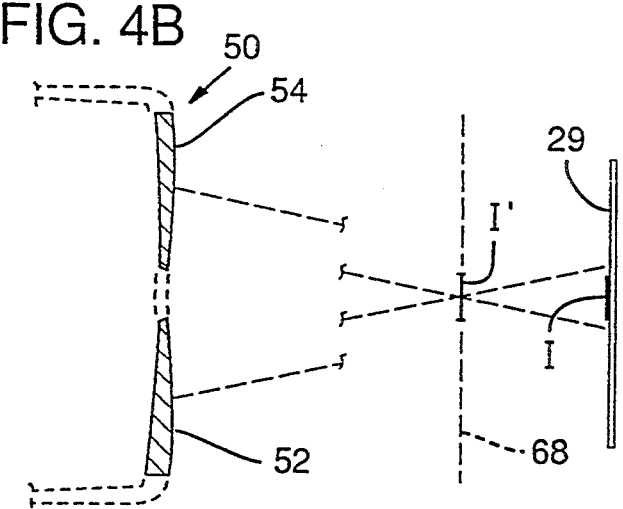

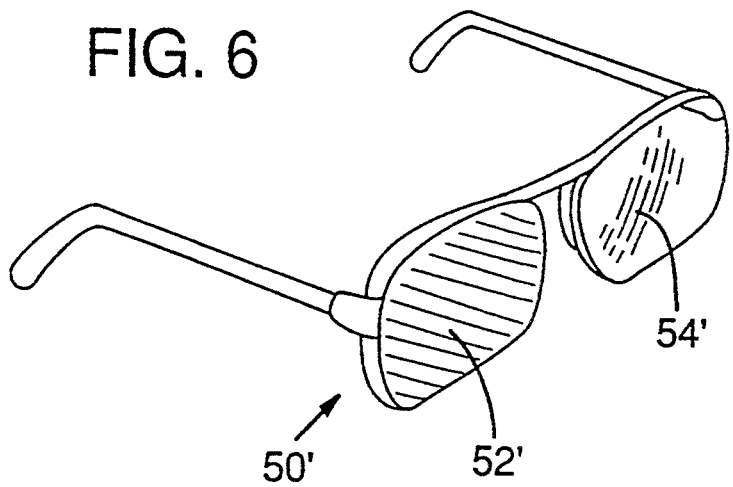
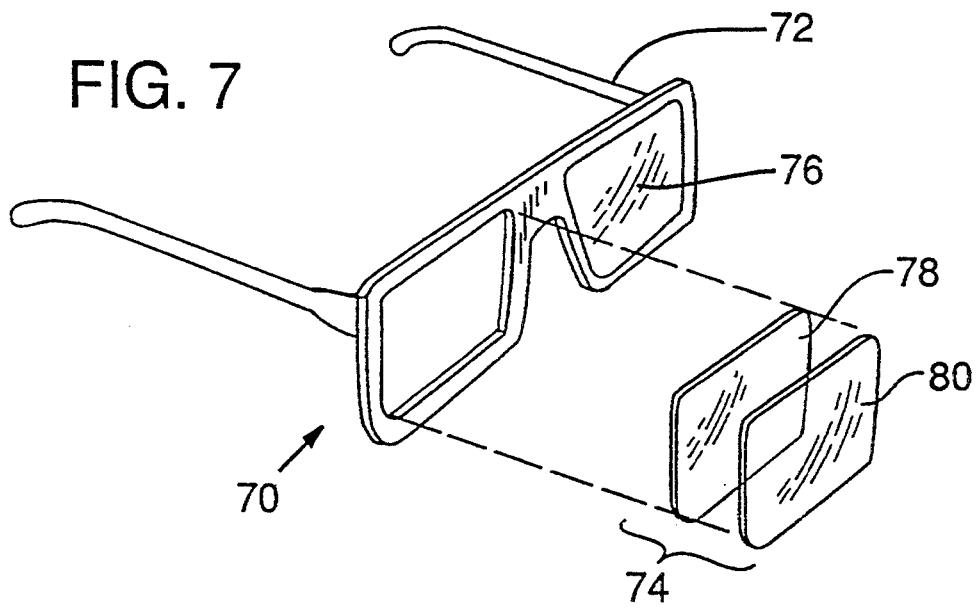

METHOD AND APPARATUS FOR GENERATING A THREE-DIMENSIONAL EFFECT FOR TWO-DIMENSIONAL IMAGES

FIELD OF THE INVENTION

This invention relates to the provision of a three-dimensional effect on motion pictures projected on two-dimensional surfaces which does not rely on special filming and projection techniques.

BACKGROUND OF THE INVENTION

Motion pictures as used herein includes all forms of image illustration on two-dimensional surfaces where the images appear to be in motion. Television and movies are two forms of motion pictures. (But not necessarily the only forms.) A two-dimensional surface here means a surface that displays an image in two-dimensional form. Thus, the "surface" itself may be curved or flat.

The concept of generating a perception of depth for images portrayed on a two-dimensional surface (having height and width only relative to the viewer) has existed for many years. Artists of course learned early on that a perception of depth can be achieved by varying size relationships, by strategic shading of objects, and even by changes in crispness of the images.

The concept of generating perceived depth dimension was carried to a new level following the advent of motion pictures. It was appreciated that much of what a viewer sees as depth is due to slight differences seen by the two eyes of a viewer. That is the two eyes being spaced apart see the image from different angles. The differences vary depending on a number of factors and the mind "learns" to recognize these differences as indicating depth. This "new" concept of generating depth relies on artificially imitating certain of these differences. Basically this was achieved by overlaying two near identical but different images on a surface, (e.g., taken by two motion picture cameras spaced apart a distance equal to the spacing of a viewer's eyes and projecting the images simultaneously onto a screen). The projections were also differentiated, e.g., by color or polarization and the viewer was required to view the projected images through special lenses that filtered out one of the projected images to one eye, and the other of the projected images to the other eye. The viewer's mind "sees" but one image and interprets the differences as depth and thus "sees" the third dimension even though it does not exist.

The above concept of three-dimensional viewing was introduced into the motion picture industry some 40 or more years ago. (See introduction to 3-D, Three-Dimensional Photography In Motion Pictures, by H. Dewhurst, the Macmillon Company, New York, 1954, incorporated herein by reference.)

The manner in which a "filmed" motion picture is produced provided yet a further alternative. The typical film projection is a series of still pictures sequentially taken of a moving object. The pictures being rapidly displayed on a screen, the viewer's mind perceives the different positions of objects in the pictures to be movement. Rather than employ two separate projectors, a somewhat three-dimensional effect is achieved by simply alternating the pictures within the sequence. Two similar but different motion picture films are produced and the frames of the two films are interspersed. One of the lenses of the glasses worn by a viewer is darkened and the other is clear. As best understood, the viewer's mind more slowly reacts to the darkened images and the film speed is timed so that the darkened images only are seen by that one eye.

In every case heretofore known, there are two essentials for providing the artificial three-dimensional effect (other than the artist's techniques of shading, etc.). There must be dual images filmed and projected onto the screen and there must be different right and left lenses covering the viewer's eyes that discriminately filter out one or the other of the images projected. Thus, unless the subject is filmed and projected using one of the methods of dual projection of an image onto a common screen to provide discriminate images for viewing by the viewer's right and left eyes, 3-D glasses have not heretofore provided the three-dimensional effect that is desired. There must be different right and left lenses that discriminately filter out the images, and there must be dual images projected onto the screen that are discriminately viewed by the right and left eyes of the viewer.

The present invention is directed to a concept that provides the desired perceived depth dimension using specialized 3-D glasses but which can provide the perceived depth dimension using standard filming, i.e., a single moving picture projected onto a two-dimensional screen.

BRIEF DESCRIPTION OF THE INVENTION

The present invention utilizes the movement of images on a two-dimensional display surface as the vehicle for developing the depth dimension which is based on the following theory.

A viewer's left and right eyes will see an image along two slightly different view lines because the eyes are about 2½ inches apart. A three-dimensional image, i.e., one that has depth, will be seen from slightly different angles by the two eyes and that angle produces a slightly different image of the same object. This difference is, of course, only one, but an important one of the indicators that is perceived by the mind of the viewer as depth dimension.

Obviously, a single object projected on a two-dimensional screen will be viewed as the same identical image to the two eyes. To create the perception of depth, the present invention provides for a lens to be provided in front of one of the viewer's eyes that slows the light transmission and thus delays the impingement of a viewed image onto that one eye relative to impingement of the image onto the other eye. Thus, the image seen by that one eye is a small fraction of a second later than when that same image is seen by the other eye. When images are non-moving, there is no difference detected by the viewer's mind. However, images that move are seen in different positions by the two eyes. Technically the differences are not the same as when seen from two slightly different angles. However, to the viewer's brain the image is similar but different and the difference is perceived as depth dimension.

As applicable for viewing a single motion picture projection, other three-dimensional enhancement techniques are beneficial. Of particular benefit is convergence. It is known that an image projected on a screen can be made to appear in front of the plane of the screen by forcing the eyes to converge so the focal point is in front of the screen, i.e., through proper grinding of the lenses which makes images on the screen appear closer to the viewer. It has been discovered that coupling the forced convergence with the lenses described above (having one lens that slows down light transmission) will enhance the three-dimensional effect of those lenses. It is believed that providing the image differentiation plus parallax and perspective which properties are inherent in the images as filmed, when coupled with convergence provide a apparent realistic (but simulated) depth dimension to the viewer's mind.

With reference now the slow down lens concept, the simple provision of a lens in front of one of the eyes, which lens slows light transmission, and without a lens in front of the other eye, is sufficient to provide the desired image differentiation. However, that basic concept can be improved upon. Known lenses all produce some refraction of the transmitted light which to some extent inherently shifts the line of sight of that eye only and thus different than the line of sight for the other eye. The viewer's brain is thus forced to deal with an unfamiliar factor (different angles of sight as between the two eyes and a lack of convergence) and this can cause discomfort. The discomfort can be alleviated by the provision of a second lens over the other eye that provides the convergence angle but without slowing light transmission, or at least to a lesser degree than that of the first eye (it being recognized that any lens will likely produce some slowing of light transmission).

A further improvement is achieved by insuring that the eye that receives the slowed down image is the dominant eye. A viewer's brain when subjected to two substantially different images from the two eyes will ignore the image of one eye in favor of the other. The brain is consistent in favoring that other eye which is referred to as the dominant eye. By experimentation it has been found that the slowed image viewed by the dominant eye will provide better three-dimensional effect than in the reverse situation.

It has also been found that optimally, the "slow down" lens is treated with a pigment that darkens the image for that eye. It has long been known that the mind more slowly reacts to darker images and thus the slow down effect of the lens can be enhanced through shading.

As previously explained a viewer's brain is taught to recognize image "differences" as being indicative of depth. There are many such differences. Most cannot be duplicated on a two-dimensional display screen but a significant number can be imitated. However, without some form of image differentiation, the depth dimensional enhancement techniques have not been acceptable for commercial application. The present invention obviates the need for projecting overlapping or sequential images provides an enhanced depth dimension for two-dimensional motion picture display that is far less complicated or expensive to produce.

The reader will appreciate that whereas motion on a display screen is important to achieving the desired image differentiation, that motion can be produced by the motion picture camera being moved past a stationary object. Thus, a picture of a motionless tree taken by a camera moving past the tree (e.g., from a car) will be moving across the screen when viewed by a viewer. An object moves when its position changes from one frame of the film to the next. It is also to be understood that a lens is any form of light transmitting media that can be discriminately placed over a viewer's eye to slow the transmission of light. It might even be an apparatus whereby light projected toward a viewer's eye is intercepted, e.g., by a mirror, and through an extended path of reflection from a plurality of mirrors, delays impingement of the image onto that eye.

The invention will become further understood and appreciated by reference to the following detailed description and drawings wherein.

DESCRIPTION OF THE DRAWINGS

FIG. 3 illustrates the filmed scene of FIG. 2 projected onto a screen;

FIG. 4 is a perspective view of a pair of glasses of the present invention for viewing the moving pictures projected on the screen of FIG. 3;

FIG. 4A is a view of the glasses of FIG. 4 as viewed on view lines 4A—4A and illustrating the different properties of light transmission for the two lenses;

FIG. 4B is a view similar to FIG. 4A but illustrating the property of light convergence;

FIG. 5 is a view of a wheel of the scene of FIG. 2 depicting image difference when viewed through the glasses of FIG. 4;

FIG. 6 is a view of another embodiment of the glasses of the present invention; and, FIG. 7 is a view of another embodiment of the glasses of the present invention.

DESCRIPTION OF THE PREFERRED EMBODIMENT

Figure 1:
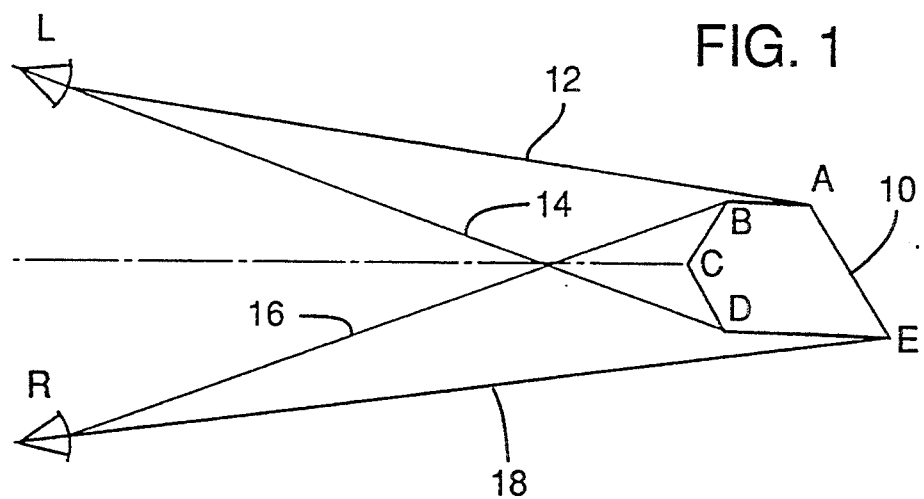
FIG. 1 is a schematic illustration of two eyes of an individual viewing an object.

The present invention is a method and apparatus for generating an illusion of depth for moving pictures projected on a plane surface. It is believed that one of the many factors involved in depth perception is the differences in images as seen by the left and right eye of the individual. FIG. 1 illustrates schematically one of the differences in the two images seen by the left and right eyes of an individual when looking at an actual, three-dimensional object centrally positioned at a distance from the eyes. The left and right eyes (designated as L and R) of an individual are looking at an object 10. A ray 12 extended from A and a ray 14 extended from D will impinge the left eye (retina) L. Rays 12 and 14 designate the extremity of the object 10 which the left eye will see. Similarly, a ray 16 extended from B and a ray 18 extended from E designate the extremity of the object which the right eye R will see. The image impinged on the left and right eyes are thus different. The left eye will see sides AB, BC and CD of the object 10 and the right eye will see sides BC, CD and DE. The image difference as between the two eyes is one of the many factors or attributes utilized by the brain in the perception of depth.

Figure 2:
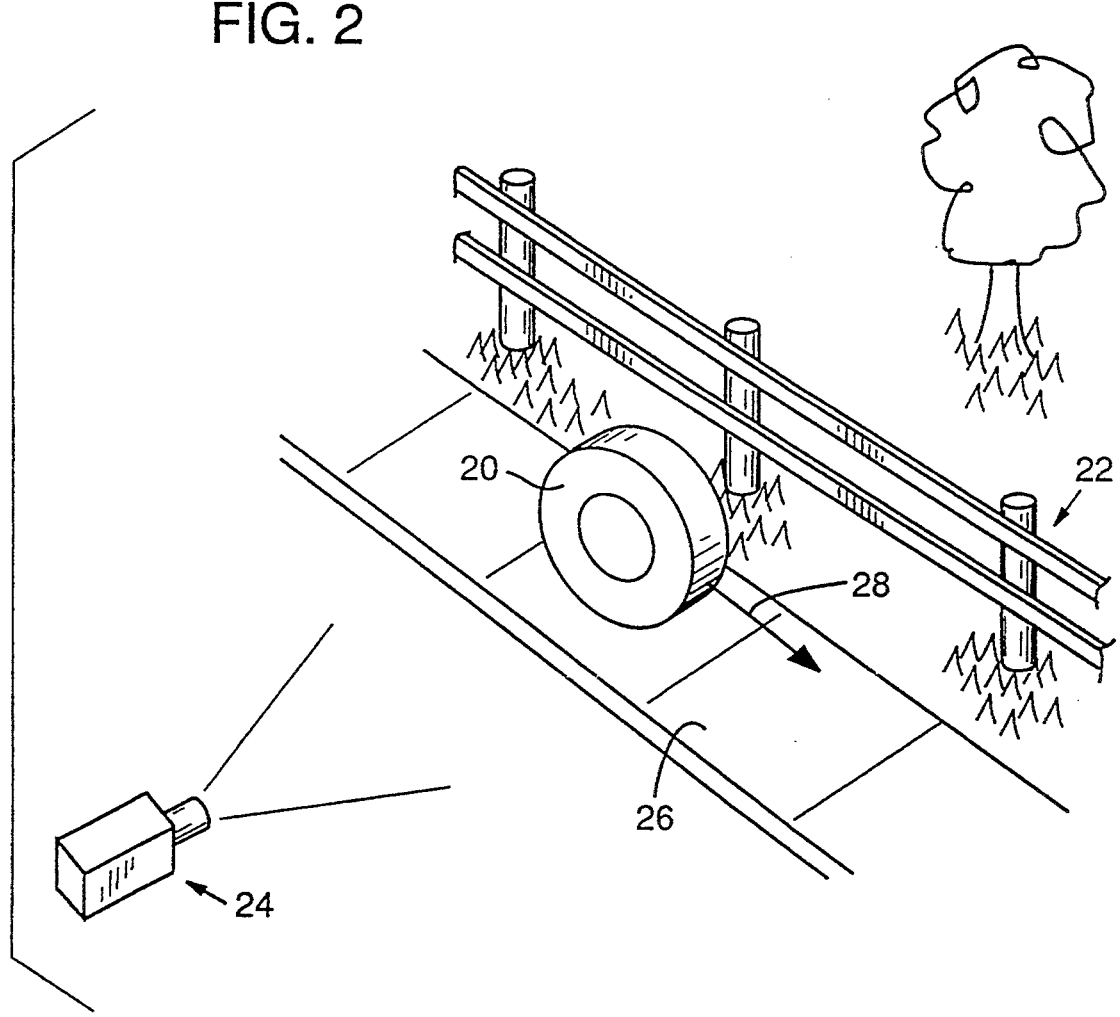
FIG. 2 is a schematic illustration of a motion picture camera filming a scene.

Consider now that a moving picture is taken of a wheel 20 rolling past a stationary fence 22 as depicted in FIG. 2. A camera 24 takes pictures of the wheel 20 as it rolls along on the sidewalk 26 traveling in the direction indicated by arrow 28. When the recorded moving pictures are projected on a screen 29 (see FIG. 3), the images of the scene are all displayed on the screen 29. However there is not a true depth perception since all of the images lie on the same plane. That is, the images are on the planar surface of the screen 29. Stated another way, the images are proper in perspective but lack in the perception of depth. That is the wheel does not "stand out" in front of the fence nor does the fence "stand out" in front of the tree and so on. The images are all at the same distance from the viewers eyes since all the images lie on the same plane and therefore there is not a discernable difference between the images impinged on the left eye versus the right eye for the objects in view. Simply put, both eyes see the same image.

Refer now to FIG. 4 of the drawings. A pair of glasses 50 are illustrated which are to be worn by an individual when viewing a moving picture projected on a planar surface. The glasses 50 have one lens 52 that has special attributes as distinguished from lens 54. The lens 52 has the property of slowing the transmission of light, that is, it decreases the velocity of light transmitted through the lens.

Consider now an individual wearing the glasses 50 and viewing the same moving pictures projected on the screen 29 of FIG. 3. As the images of the moving pictures are projected on the screen, the images will be impinged on the eyes (retina) of the individual. The image transmitted through the lens 52 will however impinge upon the eye looking through the lens 52 later than the image impinges the other eye. This time differential, even though it is minuscule, will in effect simulate a dis-similarity of images as seen by the left and right eyes. Such a differential is more accurately referred to as a phase shift in the light waves as it traverses the lens and that term will be alternately used in the description that follows. This phase shift is illustrated in FIG. 4A wherein light waves 60 and 62 are illustrated as having matching wave patterns prior to entering lenses 54 and 52, respectively (see plane 64). The wave 62 is compressed in lens 52 to a far greater extent and upon emerging (at plane 66) the light waves are out of phase. The illustration is schematic and the description is brief.

The basic concept of phase shift effect on light waves is readily available from library sources.

As seen in FIG. 5 which shows only the wheel 20 in motion as indicated by arrow 28, the eye looking through the lens 52 will perceive to see the image 20' and the other eye will see the image 20. It will be appreciated that the image difference or the positional placement of the images 20 and 20' has been exaggerated for explanatory purposes. In actuality, the image of 20' does not "appear" on the screen, but is perceived to be thus by the eye looking through the lens 52. The perceived image dis-similarity will provide stimulus to the brain to be interpreted as depth. Thus the moving wheel 20 will appear to "stand out" from the fence 22.

It will be appreciated that this phenomenon of depth will occur only for objects in motion. Thus the fence 22 will not have the perceived depth since a ray from a post for example, will be coincident for either eye even though the light has been phase shifted through the lens 52. While only one moving object has been portrayed for purposes of example, most moving pictures have much more moving action. Typically, birds are flying, people are walking, automobiles are moving and even the limbs of the trees may be in motion due to the wind and so forth. Also, recall that stationary objects will move across the screen if the picture was filmed with the camera moving, e.g., a scene filmed from a moving car.

Refer once again to FIG. 4 of the drawings. It is known that one eye of an individual is dominant. It has been found by experiment that the perception of depth achieved by wearing the glasses 50 is enhanced when the lens 52 is placed in front of the dominant eye. The lens material of the lens 52 is preferably a 1.61 high index refraction plastic. It has also been determined that the perceived depth perception is greater when the lens 52 is treated with a pigment. The lens 52 is therefore charcoal tinted so that it has a luminous transmittance of 8%. The lens 52 is a ¾ prism diopter with the axis of the prism 180 degrees base out and is of neutral power (see FIG. 4A).

The eyes of an individual converge or toe-in to align their optical axis on a point of an object which an individual intently gazes at. The refraction properties of the lens 52 will affect the toe-in and for this reason a lens 54 is also provided in the glasses 50 for the docile eye so that a wearer will not experience any discomfort when wearing the glasses 50 to view a projection of moving pictures. The material of the lens 54 is preferably 1.485 CR-39 index refraction plastic. The lens 54 is ¾ prism diopter with the axis of prism 180 degrees base out and is of neutral power. Lens 54 is clear without any tint.

Convergence has a further benefit as previously explained, i.e., it enhances the perception of depth dimension. This is illustrated in FIG. 4B. Lenses 52 and 54 are ground to have a point of convergence that is forward of screen 29, i.e., at plane 68. Thus, an image I projected on screen 29 will appear to the viewer at plane 68. Convergence, as well as parallax, and perspective are properties known to those skilled in the art and further explanation of these phenomena is not necessary.

The projection of color animation features requires a somewhat different lens arrangement than that of projections of moving pictures Referring to FIG. 6 which illustrates glasses 50' the lens 52' for the dominant eye is preferably 1.61 high index refraction plastic, ¾ prism diopter with the axis of prism 180 degrees base out. Lens 52' is of neutral power and is tinted a medium blue-green with a transmittance of 8%. Lens 54' for the docile eye is ¾ prism diopter with the axis of prism 180 degrees base out. Lens 54' for the docile eye is 1.485 CR-39 index of refraction plastic of neutral power and is tinted a medium red with a transmittance of 4%.

Glasses are frequently provided as throw-away items having frames of card stock and the lens of film material. Referring to FIG. 7, a pair of glasses 70 is illustrated having a frame 72 produced from card stock and lenses 74 and 76 of film material. Lens 74, for the dominant eye is fabricated from two separate film pieces laid one on the top of the other. The first film 78 has a medium blue green tint with a transmittance of 15%. The second film 80 has a coburn-blue tint with a transmittance of 14%. It will be appreciated that the dominant lens 74 may be of one piece of film that is equal in color and transmittance to the two films 78 and 80, however it has been found that the perception of depth is greater when the lens 74 is fabricated using the two separate films. The lens 76 for the docile eye is made from one piece of film with a medium red color tint with a transmittance of 4%.

It will be appreciated that the lens for the dominant eye has been illustrated in the glasses of the various figures for the right eye. For individuals with dominant left eyes, the lens would be changed accordingly, as for example lens 52 of glasses 50 would be placed in the glasses in front of the left eye.

Those skilled in the art will recognize that modifications and variations may be made without departing from the true spirit and scope of the invention. The invention is therefore not to be limited to the embodi-

What is claimed is:

1. Eyeglasses for creating for a viewer wearing the eyeglasses a perception of three-dimensional depth of images in motion projected onto a two-dimensional screen, said eyeglasses comprising:

an eyeglasses frame, a first lens mounted in the frame to be positioned in from a viewer's first eye and a second lens mounted in the frame to be positioned in front of a viewer's second eye;

said first and second lenses simultaneously receiving light waves transmitting said images in motion, said first lens in contrast to said second lens having a density that compresses the light waves to a greater extent than said second lens to generate a phase shift as between the light waves traversing said first and second lenses to perceptively slow the transmission of said images in motion through said first lens and onto said first eye as compared to the transmission of said images through said second lens onto said second eye wherein said images in motion projected onto a two-dimensional screen are viewed simultaneously by the two eyes at different positions on the screen to simulate depth, and said first lens being treated with a darkening pigment and thereby being darker than said second lens wherein the simulation of depth is enhanced, said first lens producing a known convergence of said first of the viewer's eyes, and said second lens provided with a convergence of said second of the viewer's eyes similar to the known convergence of said first of the viewer's eyes.

2. Eyeglasses as defined in claim 1 wherein said first of the viewer's eyes is the viewer's dominant eye.

3. Eyeglasses as defined in claim 1 wherein the first and second lenses are provided with a point of common convergence that is forward of the plane of the two-dimensional screen.

4. Eyeglasses as defined in claim 1 wherein said point of common convergence is forward of the plane of the two-dimensional screen.

5. A method of generating three-dimensional effect to a viewer using first and second eyes for viewing motion pictures projected from a single projector onto a two-dimensional screen comprising;

projecting a motion picture film having moving images onto said two dimensional display screen, providing an eyeglasses frame having first and second lenses mounted in the frame, said first lens having the property of compressing light waves to a greater extent than said second lens to perceptively slow images seen through the first lens as compared to the second lens, and treating said first lens with a darkening pigment and thereby being darker than said second lens, said first lens producing a known convergence of said first of the viewer's eyes, and providing said second lens with a convergence of said second of the viewer's eyes similar to the known convergence of said first of the viewer's eyes, placing the frame relative to the viewer's face with the first lens positioned in from of the first of the viewer's eyes and the second lens positioned in front of the second of the viewer's eyes, transmitting said moving images simultaneously to said first and second lenses, whereby the moving images of said projected motion picture are viewed simultaneously by said viewer's eyes at different positions on the screen to simulate depth.

* * * * *

UNITED STATES PATENT AND TRADEMARK OFFICE
CERTIFICATE OF CORRECTION

PATENT NO. : 5,434,613
DATED : July 18, 1995
INVENTOR(S) : Dasso

It is certified that error appears in the above-indentified patent and that said Letters Patent is hereby corrected as shown below:

Claim 1:
  Col. 7, line 9, change "from" to --front of--.

Claim 5:
  Col. 8, line 28, change "from" to --front --.

Signed and Sealed this

Third Day of October, 1995

Attest:

BRUCE LEHMAN

Attesting Officer

Commissioner of Patents and Trademarks